(12) United States Patent
Roeseler et al.

(10) Patent No.: US 6,927,567 B1
(45) Date of Patent: Aug. 9, 2005

(54) PASSIVE EDDY CURRENT BLADE DETECTION SENSOR

(75) Inventors: Cory Roeseler, Hood River, OR (US); Andreas H. von Flotow, Hood River, OR (US)

(73) Assignee: Hood Technology Corporation, Hood River, OR (US)

(*) Notice: Subject to any disclaimer, the term of this patent is extended or adjusted under 35 U.S.C. 154(b) by 0 days.

(21) Appl. No.: 10/354,616

(22) Filed: Jan. 29, 2003

Related U.S. Application Data

(60) Provisional application No. 60/356,932, filed on Feb. 13, 2002.

(51) Int. Cl.⁷ ................................................ G01B 7/30
(52) U.S. Cl. ................................................ 324/207.25
(58) Field of Search ............... 324/207.12–207.19, 324/207.25, 163, 164, 173, 174; 73/660, 73/661, 514.39

(56) References Cited

U.S. PATENT DOCUMENTS

| | | | |
|---|---|---|---|
| 3,065,412 A | | 11/1962 | Rosenthal |
| 3,932,813 A | * | 1/1976 | Gallant ........................ 324/164 |
| 4,439,728 A | | 3/1984 | Rickman, Jr. |
| 4,678,992 A | * | 7/1987 | Hametta ................. 324/207.25 |
| 4,841,243 A | * | 6/1989 | Bishop et al. ............... 324/174 |
| 4,847,556 A | | 7/1989 | Langley |
| 4,956,606 A | * | 9/1990 | Kwiatkowski et al. . 324/207.12 |
| 4,967,153 A | | 10/1990 | Langley |
| 5,015,949 A | * | 5/1991 | Koch et al. ............. 324/207.25 |
| 5,097,711 A | | 3/1992 | Rozelle et al. |
| 5,373,234 A | * | 12/1994 | Kulczyk ...................... 324/174 |
| 5,381,090 A | * | 1/1995 | Adler et al. ................. 324/174 |
| 5,942,893 A | * | 8/1999 | Terpay ................... 324/207.18 |
| 6,140,727 A | * | 10/2000 | Goto et al. .................. 310/155 |
| 6,170,148 B1 | * | 1/2001 | Van Den Berg ........... 29/602.1 |
| 6,384,595 B1 | * | 5/2002 | Ito et al. ................. 324/207.13 |

FOREIGN PATENT DOCUMENTS

JP 8-75768 * 3/1996

OTHER PUBLICATIONS

Tappert et al., Monitoring blade passage in turbomachinery through the engine case (no holes), Aerospace Conference Proceedings, 2002 IEEE, vol. 6, Iss., 2002, pp. 6-3125-6-3129.*

* cited by examiner

Primary Examiner—Bot LeDynh
(74) Attorney, Agent, or Firm—Bell, Boyd & Lloyd LLC

(57) ABSTRACT

A passive blade detection sensor exploits the electrically conductive trait of typical turbo machinery components such as fan, compressor and turbine blades. A permanent magnet is placed strategically adjacent to a wire coil to generate a single pulse/antipulse signal when a blade passes in front of the sensor. The electrically conductive blade allows eddy currents to flow briefly as it passes through the magnetic field, the local reluctance is momentarily increased, and the magnetic field is momentarily changed. The coil is sensitive only to the portion of change through its cross section, so that a simple voltage pulse, useful for precise timing of blade passage, is produced. Since the device is only sensitive to fast changes in local conductivity, blades can be detected through non-ferrous barriers such as typical engine case walls.

21 Claims, 9 Drawing Sheets

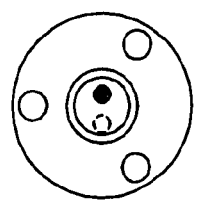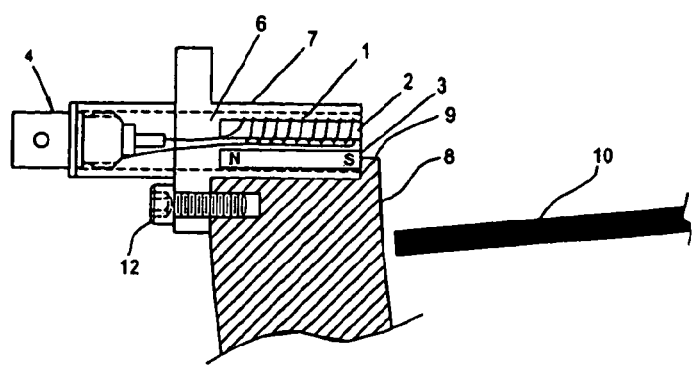
Figure 1a
Figure 1b

US 6,927,567 B1

PASSIVE EDDY CURRENT BLADE DETECTION SENSOR

The present application is directly related to U.S. provisional patent application 60/356,932, filed Feb. 13, 2002, the entire contents of which are hereby incorporated by reference and relied upon.

BACKGROUND OF THE INVENTION

1. Field of the Invention

The present invention relates to a device for the detection of passing blades in turbo-machinery.

2. Description of the Related Art

The detection of passing turbo machinery blade length (or tip clearance) and time of arrival is commonly performed using light probes, capacitive sensors, and eddy current sensors.

Passive eddy current sensors generally use permanent magnets and behave like small electrical generators. Relatively minute quantities of power are drawn from the spinning turbo machinery, so there is no need for an external power source specifically for the sensor. The magnetic reluctance of non-ferrous alloys commonly found in engine case walls, such as titanium and nickel is typically very close to that of air. Hence, there is no need to drill through-holes in the case wall, as with other types of sensors. The eddy current sensor described as the present invention sees through the wall, and many other types of debris, such as unburned fuel, ice, oil, or water, which may also be in the vicinity.

Passive eddy current blade sensing devices have been designed with one or more coils wound directly around one or more magnets, as Langley discloses in his 1989 patent "Eddy Current Clearance Transducing System" (U.S. Pat. No. 4,847,556) and again in his 1990 patent "Eddy Current Turbomachinery Blade Timing System" (U.S. Pat. No. 4,967,153). Langley describes an alternative design with the placement of a coil between two magnets. L. A. Rosenthal discloses a "Metal Detector" as a coil wound around a magnet in his 1962 patent (U.S. Pat. No. 3,065,412). However, the signal generated by these techniques usually includes complex features, such as double pulses, as depicted in FIG. 2 of the present application. The complex features of the pulse make it difficult to reliably measure tip clearance and time of arrival. A trigger threshold may be set at a value that results in a sporadic time of arrival reading that alternates between the leading peak and the trailing peak. The signal amplitude of a passive eddy current sensor usually varies with RPM and gap, hence triggering will occur on different parts of the blade at different speeds. Conversely, a signal processor easily and reliably triggers on the simple pulse generated by the present invention. This preferred pulse shape is depicted in FIG. 3 of the present application.

Several types of active eddy current sensors are currently available with two or more coils. One coil is driven with a time varying excitation voltage in the 1 kHz–1 MHz range. A second coil monitors changes in the magnetic field when electrical conductors are in the vicinity. There is no need for a permanent magnet, and one can use this type of sensor on a smooth shaft (no need for passing blades). However, the electronics and signal processors are much more complicated for this type of device, and the excitation frequency must be sufficiently high to detect the turbo-machinery blades passing in the 10–100 kHz range. GDATS and Microepsilon are two examples of active eddy current sensors with excitation frequencies sufficiently fast to detect passing turbo-machinery blades at normal operating speeds.

Rozelle et al. describes a system for monitoring shrouded blades in his 1992 patent "Shrouded Turbine Blade Vibration monitor and Target Therefor" (U.S. Pat. No. 5,097,711). However Rozelle's only references to the specific sensing devices cite the Bentley Nevada Proximitor and the "Self generating permanent magnetic sensors (e.g. Airpax sensors)." Bentley Proximitors have an excitation voltage and a frequency response of only 12 kHz. They are too slow to detect many modern turbomachinery blades, which pass a stationary sensor at up to 100 kHz. Airpax sensors have a wire coil wound on a ferro magnetic core, but the coil is placed between the magnet and the passing blades (ferrous gear teeth in most cases). This configuration is convenient for detecting the passage of ferromagnetic objects passing by the probe tip, however the magnet is placed too far from the passing blades for it to be of practical use with non-ferromagnetic blades commonly found in turbomachinery. Furthermore, the weak signal produced would have a double peak as in Rosenthal.

Rickman Jr. describes a Motion Sensor Utilizing Eddy Currents for non-ferrous blades through non-ferrous case wall materials (U.S. Pat. No. 4,439,728). However, his design calls for a relatively large magnet placed far from the sensing coil. This may be useful as a tachometer, however advanced blade vibration monitors will require a more compact probe capable of more precisely determining blade deflection relative to a single fixed point on the engine case wall. The present invention provides this feature by placing the bias magnet and pickup coil in the same barrel at the same mounting location.

SUMMARY OF THE INVENTION

The present application discloses a blade detection device comprising a permanent magnet; a wire coil placed adjacent to the magnet, where the permanent magnet and the wire coil placed adjacent to the permanent magnet comprises a sensor; mounting hardware which positions said magnet and coil in close proximity to passing rotor blades; and leads with accessible terminations to facilitate a connection to electronics for monitoring blade time of arrival and/or blade tip clearance measurements.

In preferred embodiments, the coil is wound on a ferromagnetic core; the coil and magnet are secured inside a protective barrel; and the magnet is placed adjacent to the coil and held at an angle such that a simple pulse is generated when a conductive blade passes by.

In other preferred embodiments, coil resistance is monitored for the detection of device temperature; a metallic shield is present between the sensor and the passing blades; the metallic shield is optimized in thickness and material, to reduce the signal amplitude sensitivity upon blade tip velocity; and the metallic shield is a closed end of a blind hole in the sensor.

In yet other preferred embodiments, a thermocouple wire is used to extend the coil leads to a remote connector; bias voltage of the thermocouple wire is monitored as a useful indication of device temperature; and the magnet is polarized in a direction that is parallel to a winding axis of the coil.

BRIEF DESCRIPTION OF THE DRAWINGS

FIG. 1a shows the end view of one embodiment of the present invention. An iron core is indicated by the shaded circle. A permanent magnet, indicated by the small dashed circle, is placed beside the core. No coil is shown in this view.

FIG. 1b shows a cut-away view of one embodiment of the present invention. In this view, core 2 is shown with coil 1 wrapped around it.

DETAILED DESCRIPTION

Figure 2:
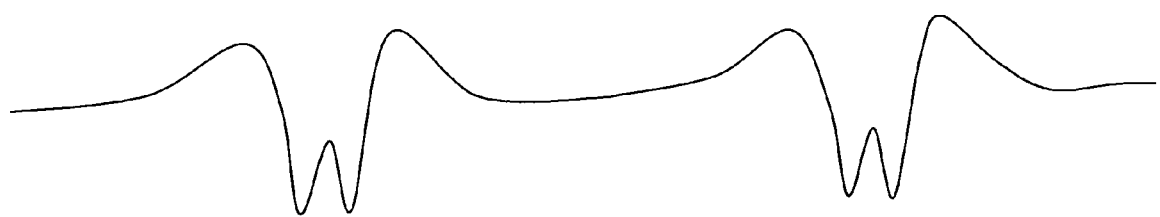
FIG. 2 shows the signal generated by two blades passing by devices disclosed by Langley and Rosenthal.

The present application discloses a blade detection device that comprises a permanent magnet; a wire coil placed adjacent to the magnet; mounting hardware which positions the magnet and coil in close proximity to passing rotor blades; and termination of coil leads to facilitate a connection to electronics for the purpose of monitoring blade time of arrival and/or blade tip clearance measurements.

The following list of elements is used throughout this application:
1. Coil
2. Core
3. Magnet
4. Connector
5. Pigtail
6. Potting compound
7. Barrel
8. Case wall
9. Shield
10. Rotor blades
11. Winding axis
12. Mounting hardware
13. Shrouded blades
14. Magnetic field The sensor is comprised of a fine wire coil 1 wound onto a ferro-magnetic core 2. The coil assembly is placed adjacent to a magnet 3 that is polarized in a direction parallel to the winding axis of the coil 1. This combination of magnet, coil, and ferromagnetic return path form the critical elements of the sensor. Several variations in connector detail and mounting hardware 12 are anticipated.

One embodiment of the invention employs a potting compound 6, which secures the critical elements described above inside a protective barrel 7. The leads from the coil terminate at a connector 4 or a pigtail 5 at one end of the barrel 7. For high-temperature applications, the pigtail 5 may be shielded by a metallic conduit, and the connector 4 is placed far enough from the heat source, that conventional solder contacts or crimp connections may be used. If thermocouple wire is used for the pigtail 5, a bias voltage will report the difference between the temperature at the sensor and the temperature at the remote end of the pigtail 5 or connector 4. In this embodiment, the passive eddy current sensor is also a temperature probe.

If the sensor does not penetrate completely through the case wall, the remaining thickness of material will act like a shield 9 between the sensor and the rotor blades 10. In most cases, this shield 9 has only the disadvantage of displacing the sensor farther from the rotor blades 10, provided that the shield material is not ferro-magnetic. For example, the placement of a 1/16" non-ferrous shield between the sensor and the passing blades usually results in 10–30% reduction of signal. By contrast a 1/16" ferro-magnet shield attenuates the signal by 10,000%.

Common turbo-machinery features such as shrouded blades 13 are also of little significance to the present invention, since the flux lines pass through the smooth shroud and only become perturbed when blades pass through the field.

A metallic shielding material may be added intentionally to make the passive eddy current sensor less sensitive to changes in blade velocity. This technique has the added benefit of thermal protection from the potentially hot gasses inside the engine, and the elimination of the possibility that sensor components may fall into the engine. One way to provide this metallic shield is to drill a blind hole in the sensor barrel. The remaining thickness of material at the bottom of the hole is the shield, and the open end provides access for the sensor leads or pigtail 5.

The barrel 7 may have external threads, a flange or other mechanical features to facilitate secure mounting into a boss or case wall 8. The eddy current sensor must be mounted securely to eliminate relative motion between the sensor and the turbo-machinery, especially in the case of the shielded sensor. Relative motion between the sensor and a vibrating engine case, for example, makes reliable blade detection more difficult.

The sensor is mounted with a prescribed angular orientation to maximize and correctly shape the electrical signal generated by passing blades 10. In the absence of blades 10, magnetic flux is directed through the end of the magnet 3. It continues an arc through space and flows freely through the ferro-magnetic core 2. When a conductive blade 10 passes quickly through the magnetic field, eddy currents form in the blade material, and the local magnetic field is perturbed. Flux lines shift to form a new magnetic field with a reduced energy state. The portion of this shift in magnetic field that penetrates the coil windings causes a voltage potential across the coil leads. Arranging for the blade to pass by the magnet 3 first, then the coil 1, can usually maximize and properly shape the resulting signal.

Relative blade length or tip clearances are monitored by careful calibration techniques. Since the signal varies with distance between the sensing elements (magnet and coil) and the passing blade, one can infer tip clearance from the pulse magnitude. Blade temperature, blade speed, blade geometry and blade material also effect pulse amplitude, and consideration of these parameters is required to maintain blade length calibration.

Magnet and coil materials are selected based on a list of design criteria including operating temperature, material cost, gap and size constraints. Smaller sensors placed further from a rotor blade generate smaller signals. A magnet material of high energy density such as Neodymium Iron Boron or Samarium Cobalt helps to increase signal amplitude. Also a fine wire gage allows a large number of turns around the core increasing signal amplitude. For high temperature applications, Alnico magnets and ceramic insulated magnet wire may be used. The coil leads may be extended with high temperature wire, so that a connector may be located far from the heat. In this case, thermocouple wire may be used, and the bias voltage reports sensor temperature. An inexpensive device may be constructed from coarse wire with enamel insulation, an alnico magnet, and a plastic connector soldered to the leads.

With specific reference to the Figures, FIGS. 1a and 1b show a cut away view of a preferred embodiment of the present invention. The coil 1 is sketched with only ten turns for illustration purposes. In practice the fine wire makes several hundred turns around the core 2. The device is mounted with hardware 12 to an engine case wall 8 so that the blade passes the magnet first, then the coil. The case wall 8 is drilled from the outside with only blind holes, and the remaining shield 9 of case wall material remains between the sensor tip and the passing blade.

FIG. 2 is a voltage v. time trace for a typical passive eddy current sensor (Prior Art). Langley discloses this feature in his 1998 and 1990 patents. The characteristic double peak appears when a blade passes. The double peak makes triggering difficult for signal processors.

Figure 3:
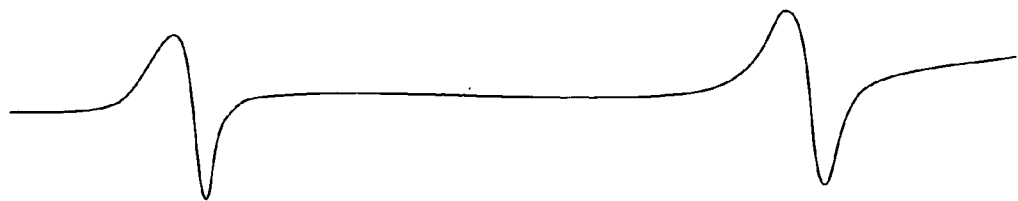
FIG. 3 shows the signal generated by two blades passing by present invention.

FIG. 3 is a voltage v. time trace for the present invention. The single pulse and sharp falling edge make triggering easy.

Figure 4A:
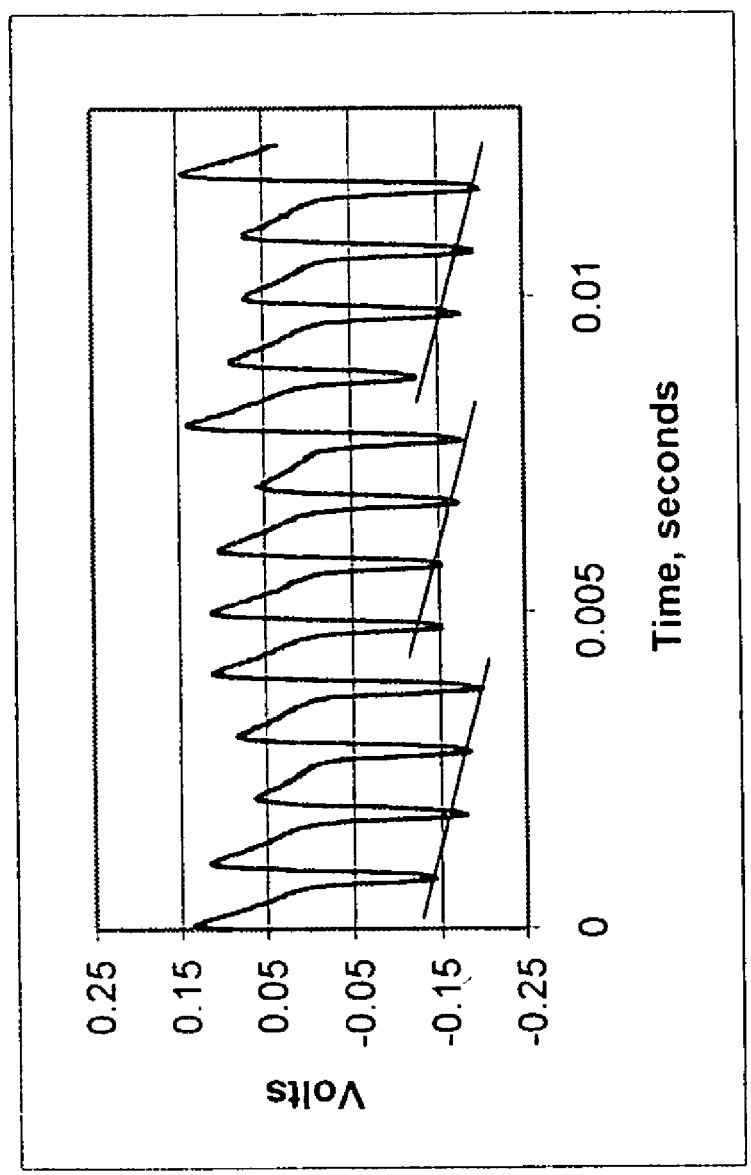
FIG. 4a is the time trace for one revolution of a bladed rotor with 12 blades.

FIG. 4a is the time trace for one revolution of a bladed rotor with 12 blades. The blade lengths are staggered in length by 0.0005 inches. The lengths of 3 groups of 4 blade lengths are observed, and a trend line is drawn to show signal v. blade length calibration with 0.0005-inch resolution.

Figure 4B:
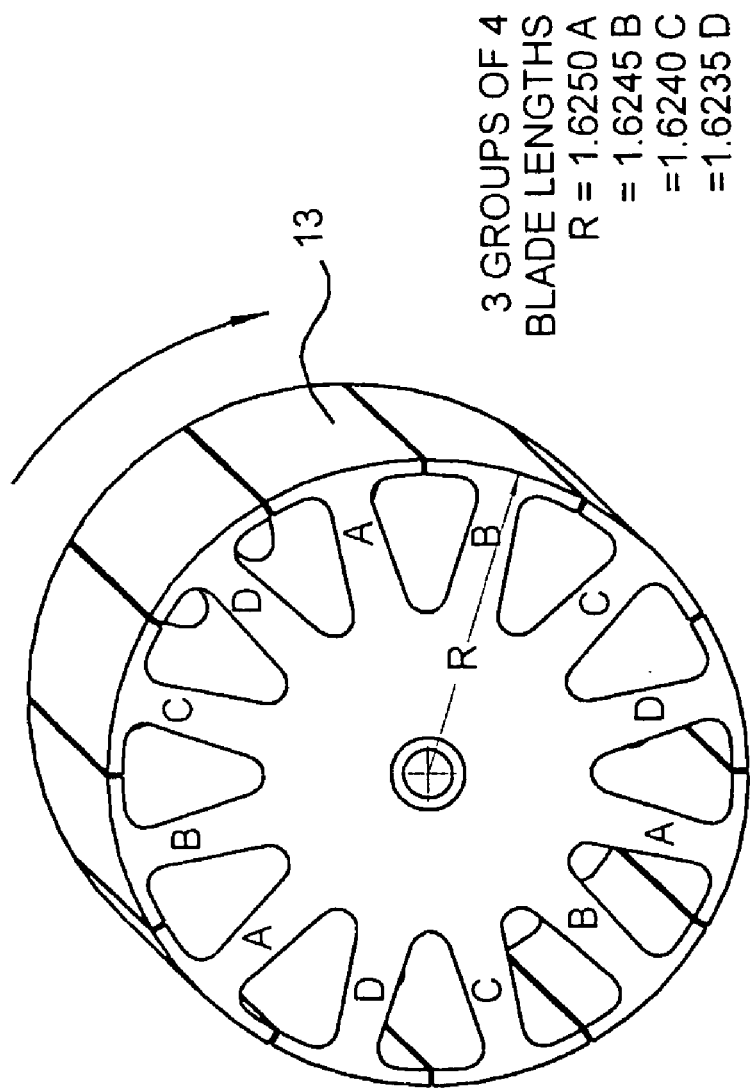
FIG. 4b illustrates the sample rotor with varying blade lengths and shrouded tips.

FIG. 4b illustrates the sample rotor with varying blade lengths and shrouded tips. More specifically, FIG. 4b shows the shrouded test rotor with 12 shrouded blades built to demonstrate sensor's ability to see through shrouds and resolve 0.0005-inch differences in blade lengths.

Figure 4C:
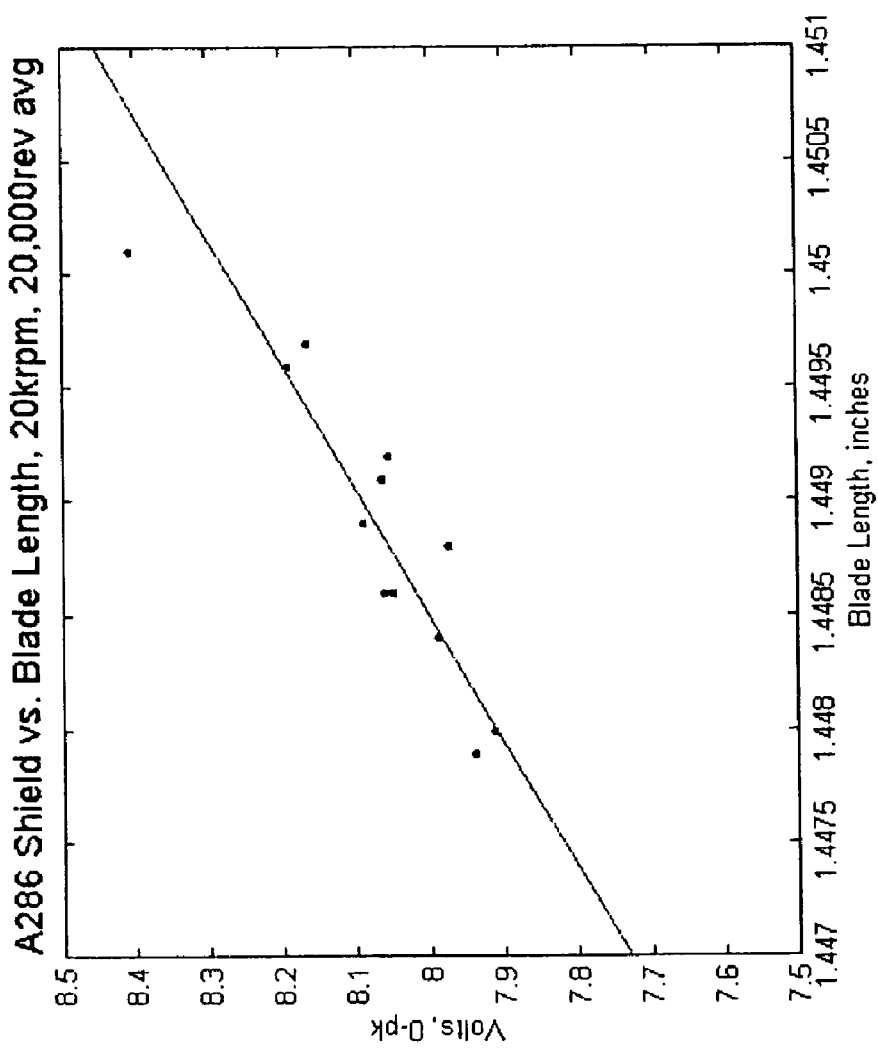
FIG. 4c shows peak voltage for each blade of an unshrouded version of the rotor plotted versus blade length, measured with a micrometer.

FIG. 4c shows peak voltage for each blade of an unshrouded version of the rotor plotted versus blade length, measured with a micrometer. The correlation fits a linear profile with better than 0.0005" resolution.

Figure 5A:
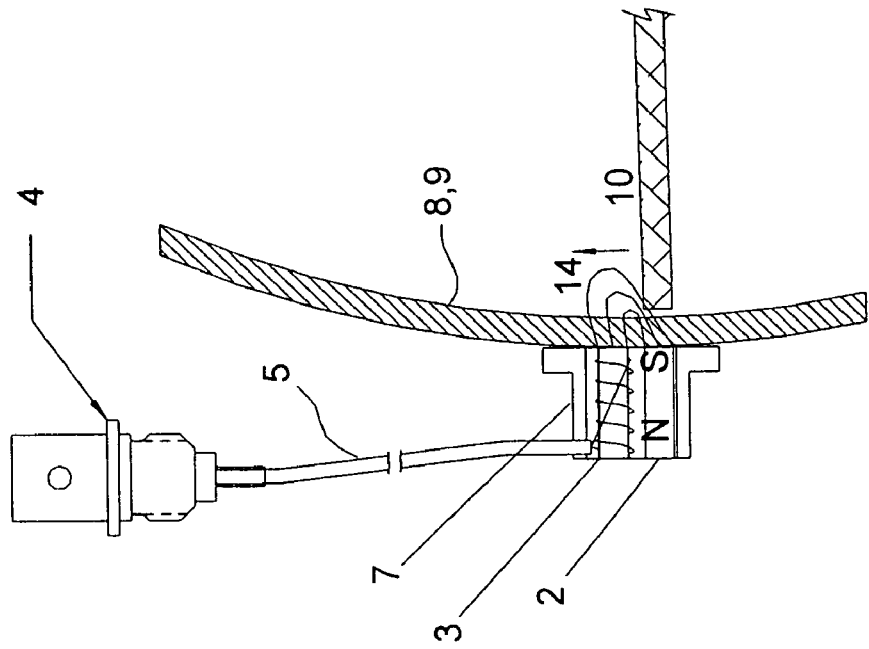
FIGS. 5a and 5b show an alternative embodiment of the present invention for high temperature applications where radial space may be limited as in the inner engine case of a gas turbine.
Figure 5B:
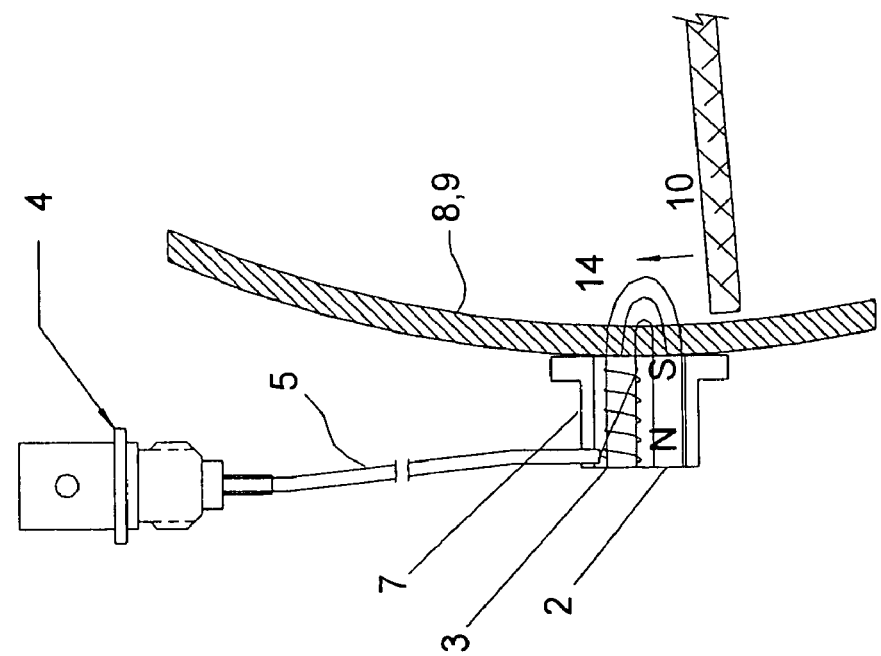

FIGS. 5a and 5b show an alternative embodiment for high temperature applications where radial space may be limited as in the inner engine case of a gas turbine. A pigtail may extend the leads to a cool region with stainless steel clad thermocouple wire. Alnico magnets and ceramic insulated wire may be required in temperatures exceeding 200 degrees F. The magnetic field 14 is shown undisturbed in FIG. 5a. Then in FIG. 5b, as the blade passes through the field at high speed, the field changes shape to minimize the energy state and an electrical pulse is generated by the coil.

Figure 6:
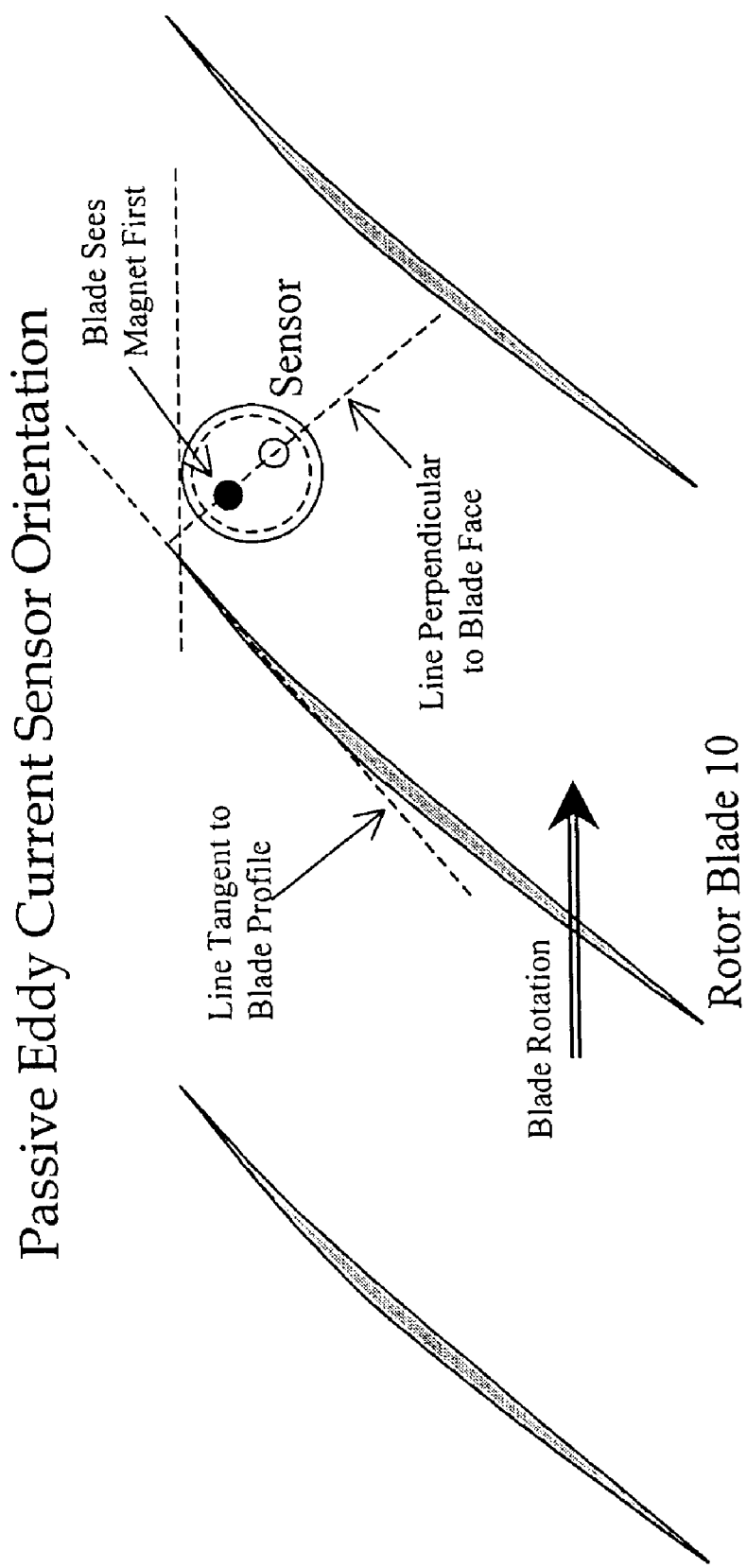
FIG. 6 specifies the correct angular position of the sensor's magnet with respect to blade angle and trajectory.

FIG. 6 illustrates the optimal sensor orientation. The sensor should be oriented so that the blades pass the magnet before the core. Since the sense elements of the present invention is symmetric about only one axis in the end view, the device is sensitive to angular orientation with respect to blade angle and blade trajectory. FIG. 6 specifies the correct angular position of the sensor's magnet with respect to blade angle and trajectory.

Figure 7:
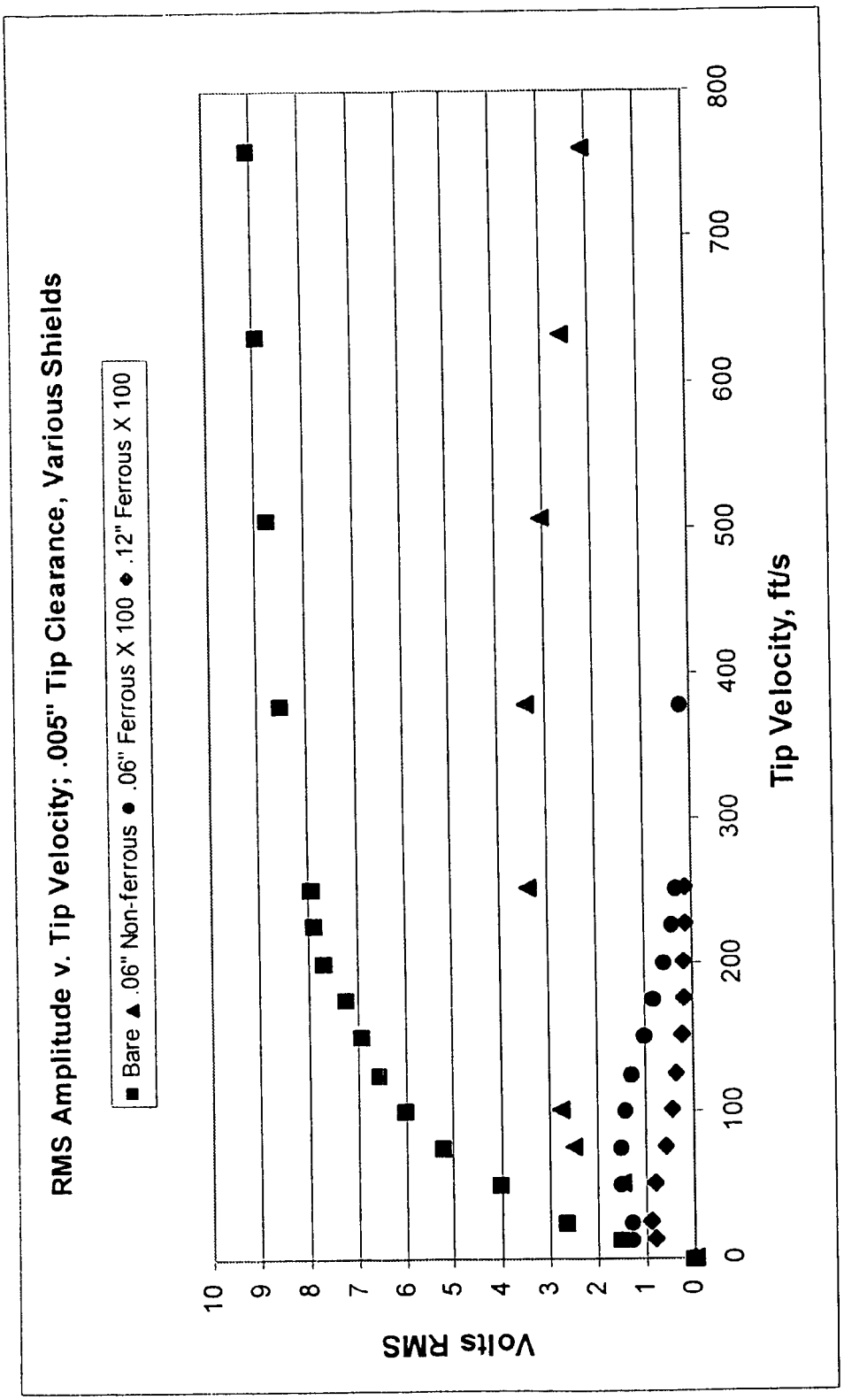
FIG. 7 shows RMS amplitude plotted versus tip velocity for a bare sensor, ferrous and non-ferrous shields.

FIG. 7 shows how signal amplitude varies with blade tip velocity. The effect of shielding with ferrous and non-ferrous alloys is shown for tip velocities up to 800 ft/s.

Figure 8:
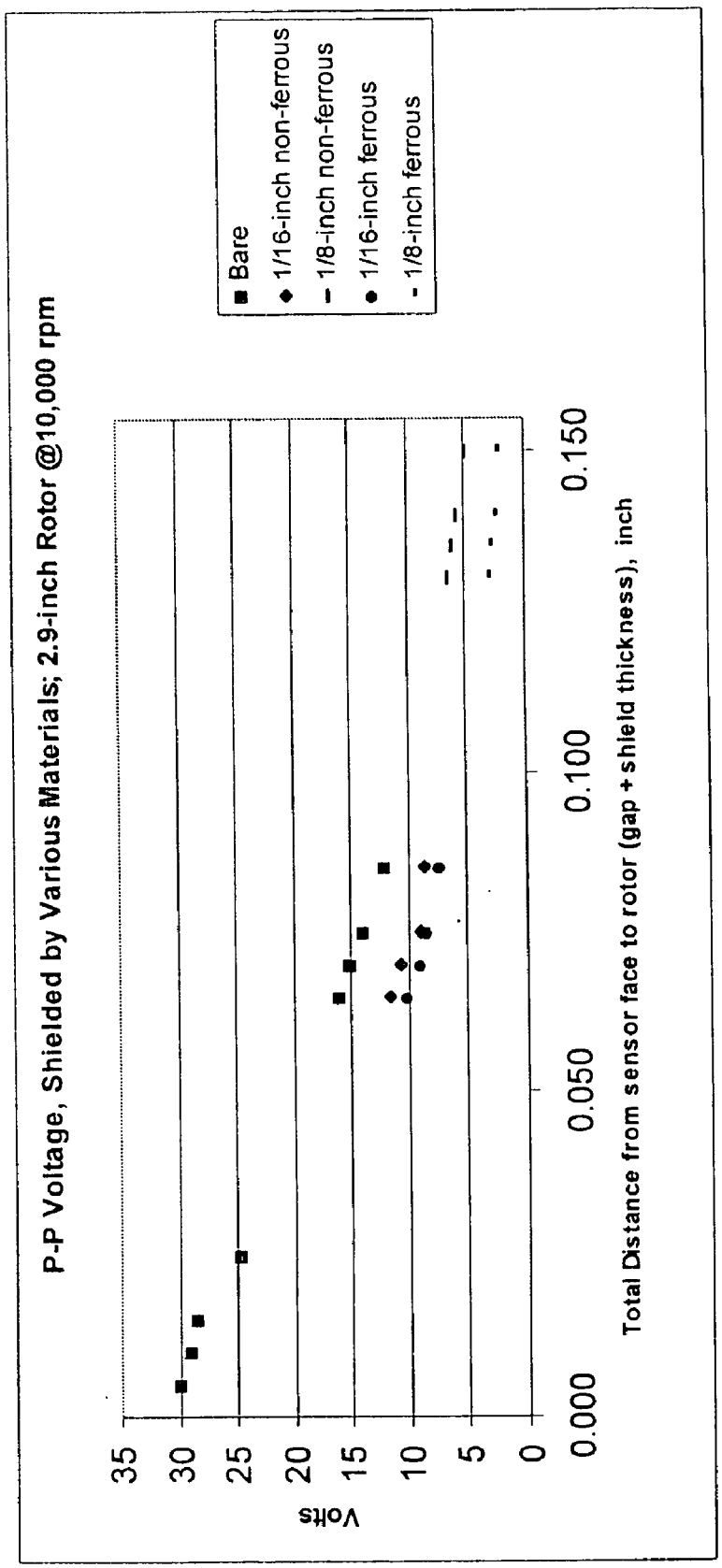
FIG. 8 shows signal amplitude plotted versus gap for a bare sensor, ferrous and non-ferrous shields of 1/16 and 1/8-inch thickness.

FIG. 8 shows signal amplitude plotted versus gap for a bare sensor, ferrous and non-ferrous shields of 1/16 and 1/8-inch thickness.

While the invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the appended claims.

Thus, it is to be understood that variations in the present invention can be made without departing from the novel aspects of this invention as defined in the claims. All patents and articles cited herein are hereby incorporated by reference in their entirety and relied upon.

What is claimed is:

1. A blade detection device, comprising:
   a) a single permanent magnet;
   b) a single wire coil placed adjacent to said magnet, wherein said permanent magnet and said wire coil placed adjacent to said permanent magnet comprises a sensor;
   c) mounting hardware which positions said magnet and coil in close proximity to passing rotor blades, wherein said device is oriented such that said blade passes said magnet before passing said coil; and
   d) leads, coupled to said sensor, said sensor outputting at least one signal for monitoring blade time of arrival and/or blade tip clearance measurements.

2. The device according to claim 1, where in the coil is wound on a ferro-magnetic core.

3. The device according to claim 1, wherein the coil and magnet are secured inside a protective barrel.

4. The device according to claim 1, wherein the magnet is placed adjacent to the coil and held at an angle such that a simple pulse is generated when a conductive blade passes by.

5. The device according to claim 1, wherein a metallic shield is present between the sensor and the passing blades.

6. The device according to claim 5, wherein the metallic shield is optimized in thickness and material, to reduce the signal amplitude sensitivity upon blade tip velocity.

7. The device according to claim 5, wherein the metallic shield is a closed end of a blind hole in a protective barrel of the sensor.

8. The device according to claim 1, wherein a thermocouple wire is used to extend the coil leads to a remote connector.

9. The device according to claim 8, wherein bias voltage of the thermocouple wire is monitored as a useful indication of a device temperature.

10. The device according to claim 1, wherein the magnet is polarized in a direction that is parallel to a winding axis of the coil.

11. A blade detection device, comprising:
   a single permanent magnet;
   a single wire coil placed adjacent to said magnet, wherein said permanent magnet and said wire coil placed adjacent to said permanent magnet comprises a sensor;
   mounting hardware which positions said magnet and coil in close proximity to passing rotor blades; and
   leads, coupled to said sensor, said sensor outputting at least one signal for monitoring blade time of arrival and/or blade tip clearance measurements.

12. A blade detection device, comprising:
   a) a permanent magnet;
   b) a single wire coil placed adjacent to said magnet, wherein said permanent magnet and said wire coil placed adjacent to said permanent magnet comprises a sensor, wherein the coil and magnet are secured inside a protective barrel;

c) mounting hardware which positions said magnet and coil in close proximity to passing rotor blades, wherein said device is oriented such that said blade passes said magnet before passing said coil; and d) leads, coupled to said sensor, said sensor outputting at least one signal for monitoring blade time of arrival and/or blade tip clearance measurements.

13. A blade detection device, comprising:

a permanent magnet;

a single wire coil placed adjacent to said magnet, wherein said permanent magnet and said wire coil placed adjacent to said permanent magnet comprises a sensor, wherein the coil and magnet are secured inside a protective barrel;

mounting hardware which positions said magnet and coil in close proximity to passing rotor blades; and leads, coupled to said sensor, said sensor outputting at least one signal for monitoring blade time of arrival and/or blade tip clearance measurements.

14. A blade detection device, comprising:

a) a permanent magnet;

b) a single wire coil placed adjacent to said magnet, wherein said permanent magnet and said wire coil placed adjacent to said permanent magnet comprises a sensor;

c) mounting hardware which positions said magnet and coil in close proximity to passing rotor blades, wherein said device is oriented such that said blade passes said magnet before passing said coil, and wherein a metallic shield is present between the sensor and the passing blades; and d) leads, coupled to said sensor, said sensor outputting at least one signal for monitoring blade time of arrival and/or blade tip clearance measurements.

15. The device according to claim 14, wherein the metallic shield is optimized in thickness and material, to reduce the signal amplitude sensitivity upon blade tip velocity.

16. The device according to claim 15, wherein the metallic shield is a closed end of a blind hole in a protective barrel of the sensor.

17. A blade detection device, comprising:

a permanent magnet;

a single wire coil placed adjacent to said magnet, wherein said permanent magnet and said wire coil placed adjacent to said permanent magnet comprises a sensor;

mounting hardware which positions said magnet and coil in close proximity to passing rotor blades, and wherein a metallic shield is present between the sensor and the passing blades; and leads, coupled to said sensor, said sensor outputting at least one signal for monitoring blade time of arrival and/or blade tip clearance measurements.

18. The device according to claim 17, wherein the metallic shield is optimized in thickness and material, to reduce the signal amplitude sensitivity upon blade tip velocity.

19. The device according to claim 18, wherein the metallic shield is a closed end of a blind hole in a protective barrel of the sensor.

20. A blade detection device, comprising:

a) a permanent magnet;

b) a single wire coil placed adjacent to said magnet, wherein said permanent magnet and said wire coil placed adjacent to said permanent magnet comprises a sensor, and wherein a thermocouple wire is used to extend the coil leads to a remote connector;

c) mounting hardware which positions said magnet and coil in close proximity to passing rotor blades, wherein said device is oriented such that said blade passes said magnet before passing said coil; and d) leads, coupled to said sensor, said sensor outputting at least one signal for monitoring blade time of arrival and/or blade tip clearance measurements, and wherein a bias voltage of the thermocouple wire is monitored as a useful indication of a device temperature.

21. A blade detection device, comprising:

a permanent magnet;

a single wire coil placed adjacent to said magnet, wherein said permanent magnet and said wire coil placed adjacent to said permanent magnet comprises a sensor, and wherein a thermocouple wire is used to extend the coil leads to a remote connector;

mounting hardware which positions said magnet and coil in close proximity to passing rotor blades; and leads, coupled to said sensor, said sensor outputting at least one signal for monitoring blade time of arrival and/or blade tip clearance measurements and wherein a bias voltage of the thermocouple wire is monitored as a useful indication of a device temperature.

* * * * *

UNITED STATES PATENT AND TRADEMARK OFFICE
CERTIFICATE OF CORRECTION

| | |
|---|---|
| PATENT NO. | : 6,927,567 B1 |
| APPLICATION NO. | : 10/354616 |
| DATED | : August 9, 2005 |
| INVENTOR(S) | : Corydon C. Roeseler et al. |

It is certified that error appears in the above-identified patent and that said Letters Patent is hereby corrected as shown below:

<u>Drawings,</u>
Figure 5a, delete "2" and add -- 3 --.
Figure 5a, delete "3" and add -- 2 --.
Figure 5b, delete "2" and add -- 3 --.
Figure 5b, delete "3" and add -- 2 --.

Signed and Sealed this

Twentieth Day of June, 2006

JON W. DUDAS
*Director of the United States Patent and Trademark Office*